J. K. Ingalls,
Oil Tank.
No 53,829. Patented Apr. 10, 1866.
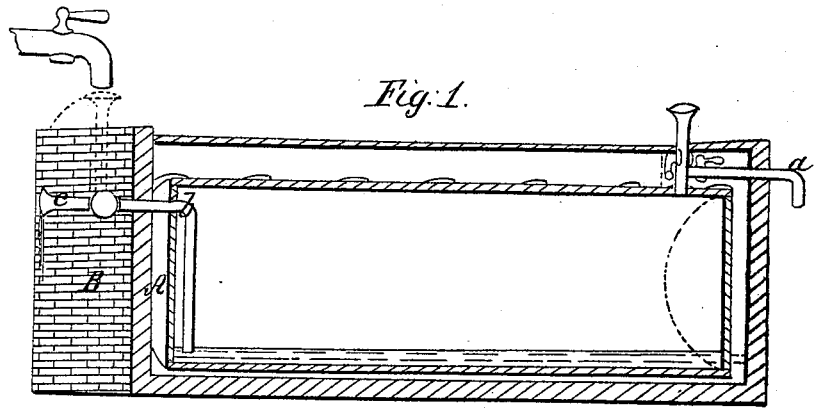
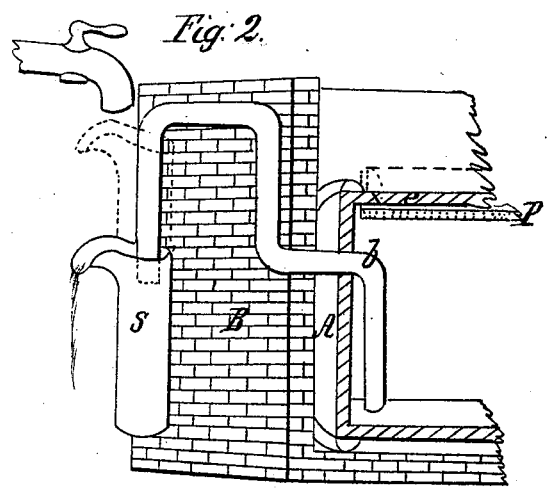
Inventor,
Joshua K. Ingalls.

UNITED STATES PATENT OFFICE.

JOSHUA K. INGALLS, OF NEW YORK, N. Y.

IMPROVEMENT IN OIL-TANKS.

Specification forming part of Letters Patent No. 53,829, dated April 10, 1866.

*To all whom it may concern:*

Be it known that I, JOSHUA K. INGALLS, of the city of New York, county of New York, and State of New York, have invented a new and improved mode of relieving the hydrostatic pressure in submerged tanks or vessels for storing petroleum and other oils, naphtha, &c.; and I hereby declare the following to be a full and exact description of the same, reference being had to the accompanying drawings, forming part of this specification, in which—

Figure I is a longitudinal section of the tank and reservoir, showing the arrangement of pipes, &c., in perspective; Fig. II, a portion of the same, showing alternate device and arrangement of a strainer or sprinkler.

A is an oil tank or vessel. B is a reservoir of water, in which A is submerged. $a$ is a pipe for discharging oil, with receiving branch. $b$ is a relief or waste pipe. $c$ is an arm of $b$, connected with joints. $s$ is a sliding case, and used as a substitute for $b$. $p$ is a strainer or sprinkler, and $e$ is a cover to strainer to suspend its use at will.

The nature of my invention consists in providing a submerged tank or vessel for holding, storing, or transporting oils, &c., with an escape-pipe or duct leading from near the bottom of the tank or vessel to the outside of the water-reservoir, or to a lower level, so that the pressure within the tank or vessel may be reduced below the pressure of the water in the reservoir or vessel in which it (the tank) is submerged; also, in providing a jointed arm or equivalent device to regulate the pressure within the tank or vessel, as desired.

To enable others skilled in the art to construct and use my said invention, I will proceed to describe more fully its construction and operation.

I construct my tank of metal, wood, or masonry. I place it in a reservoir or natural pond, or in navigable water, and securely submerge it by weights or by any feasible method. I anchor it fast, or provide for its being towed from place to place, or I arrange it in any boat or vessel or on any railroad-car. I provide pipes $a$ and $b$, as shown, with the requisite stopcocks, &c. The relief or escape pipe $b$ is so placed as to lead from a stratum of water in the bottom of my tank or vessel to a level below the surface of the water surrounding said tank or vessel, by which means the hydrostatic pressure within the tank is relieved and rendered less than that of the water surrounding the tank. To adjust or regulate the pressure within the tank I arrange the arm of said escape or relief pipe, $c$ with a working joint, so that the mouth of said arm can be elevated or depressed at pleasure. When my tank is submerged in a pond or river I provide for the escape of the waste water by sinking down a shaft or well, into which the water flows from the mouth of $c$, and is pumped or bailed out as circumstances require; or I attain substantially the same result by employing a separate vessel to receive the waste water. In the place of the jointed arm $c$, as an alternate, I form the projecting part of pipe $b$ like a siphon, as shown in Fig. II, and provide a sliding case, $s$, with proper mouth for discharge, and by elevating or depressing said sliding case effect substantially the same result as by the use of the jointed arm $c$.

To operate my tank I elevate the mouth of waste-pipe till it is nearly on a level with the surface of the water in the reservoir and fill the tank with water. I then commence to fill the tank with oil through the supply-branch of $a$, the stop-cock to $a$ being closed. Now, as the oil flows in at the top of the tank the water is forced out through $b$. To adjust the pressure within the tank the mouth of $c$ is depressed gradually as the tank is becoming filled with oil. By this adjustment the oil is always sustained against the top of the tank, whether wholly or partially filled with oil, and yet the hydrostatic pressure within the tank is always kept reduced below the pressure of water outside of the tank. When no more oil is to be received into the tank I adjust the mouth of the relief or waste pipe so as to allow of the escape of any water which may leak into the tank. When the oil is required to be discharged I elevate the mouth of $c$, open the stop-cock to $a$, and let in water through $c$ and $b$ until the tank is filled with water and the oil consequently discharged. I also provide, when desiring to wash or treat oils in my tank, a sprinkler or strainer, $p$, Fig. II, in the top of the tank, with a tight-fitting cover, $e$. By the excess of pressure on the outside the water is forced through the sprinkler and passes down through the oil in minute streams, effectually washing the oil of all salts, chemicals, or sediment. By use of the cover $e$ the process of washing is suspended at will.

It is obvious that the oil may be discharged from my tank by introducing water through a separate pipe or through openings into the main reservoir, so that $b$ and $c$ could be used for a waste or relief pipe only. It is also obvious that the oil may be discharged by the usual means without filling the tank with water, and it is also equally plain that my tank can be constructed directly at the wells where oil is produced, and so arranged as to cover the tubing and give complete security against fire; but of many modifications substantially the same as I have described I have not deemed it necessary to speak.

In the oil-tanks heretofore constructed to be used under water no mode has been devised to relieve the oil from the pressure of water leaking into the tanks. Petroleum is of about one-fifth less specific gravity than water. Naphtha is still lighter. Now, if water is allowed to leak into the tank or otherwise act upon these oils so stored, it will force them in that proportion above its own level. It is well known that oil stored under water in barrels is insecure, inasmuch as the water soaks and leaks into the barrels and forces the oil out. Instances are known in which the oil has been entirely displaced and the barrels filled with water.

By my invention the pressure is sufficiently removed from the inside of the tank, so that any amount of leakage within the capacity of the waste-pipe $b$ to discharge will yet cause no leakage of oil. A slight pressure is always maintained upon the outside of the tank greater than the pressure within, so that no oil can escape, and the same excess of pressure on the outside enables me to build my tank of less expensive material and strength, as that excess of pressure is always exerted to hold the tank together, and if the tank is made of porous material the water is thus forced into the pores and prevents the leakage of oil through the pores, and also any soakage of oils into said pores.

Having therefore fully described my said invention, what I claim in an oil tank or vessel subjected to external hydrostatic pressure, is—

1. The means of relieving the pressure within the tank or vessel, substantially as described.

2. The jointed arm $c$, or any equivalent device operated to regulate or adjust the pressure within the tank or vessel.

3. The strainer or sprinkler $p$, arranged as shown, and operated in connection with the relief-pipe, as described.

JOSHUA K. INGALLS.

Witnesses:
THEODORE D. RANDALL,
W. H. DAME.